(12) United States Patent
Miyanabe et al.

(10) Patent No.: US 6,249,498 B1
(45) Date of Patent: Jun. 19, 2001

(54) TILT DETECTING METHOD IN RECORDED INFORMATION REPRODUCING APPARATUS

(75) Inventors: Shogo Miyanabe; Hiroki Kuribayashi, both of Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/206,926

(22) Filed: Dec. 7, 1998

(30) Foreign Application Priority Data

Dec. 8, 1997 (JP) .................................................. 9-337213

(51) Int. Cl.$^7$ ................................. G11B 3/90; G11B 7/00
(52) U.S. Cl. ...................................... 369/53.19; 369/44.32
(58) Field of Search ............................... 369/124.1, 44.32, 369/44.25, 44.34, 44.23, 53.19

(56) References Cited

U.S. PATENT DOCUMENTS

| | | | |
|---|---|---|---|
| 4,674,078 | * | 6/1987 | Otsuka et al. ..................... 369/44.25 |
| 5,321,519 | * | 6/1994 | Akiyama ................................. 369/54 |
| 5,808,985 | * | 9/1998 | Gerber et al. ..................... 369/44.32 |
| 5,889,752 | * | 3/1999 | Maeda et al. ..................... 369/124.1 |
| 5,909,413 | * | 6/1999 | Araki ............................... 369/44.32 |

* cited by examiner

Primary Examiner—Thang V. Tran
Assistant Examiner—Kim-Kwok Chu
(74) Attorney, Agent, or Firm—Perman & Green, LLP

(57) ABSTRACT

A tilt detecting method which can accurately detect a tilt occurring between a recording disk and a pickup by a construction of a small scale. The reading position of the pickup for the center recording track among the three adjacent recording tracks formed on the recording surface of the recording disk is set to a reference. The tilt between the recording disk and the pickup is detected based on a differential value between a crosstalk from each of the positions which are displaced forward and rearward from the reading position on the recording track that is neighboring on the disk's outer rim side of the center recording track by a predetermined distance in the reading direction to the reading position and a crosstalk from each of the positions which are displaced forward and rearward from the reading position on the recording track that is neighboring on the disk's inner rim side by a predetermined distance in the reading direction to the reading position.

9 Claims, 9 Drawing Sheets

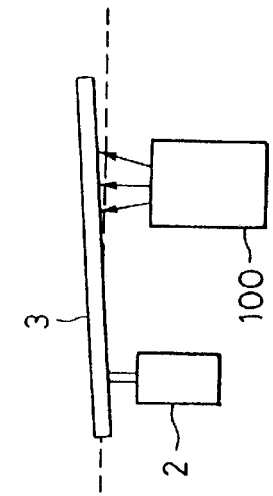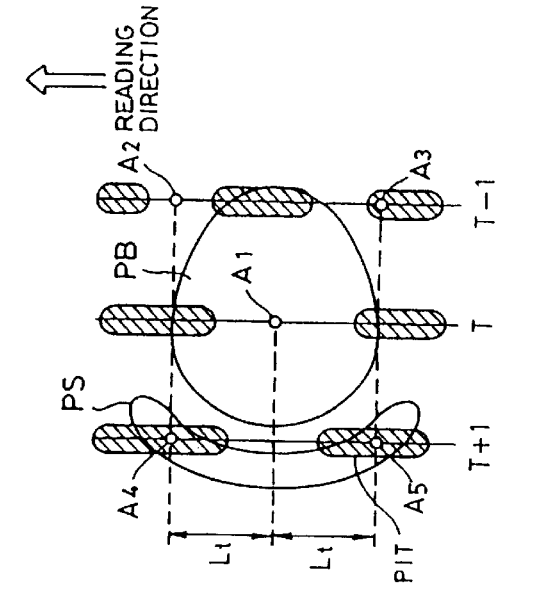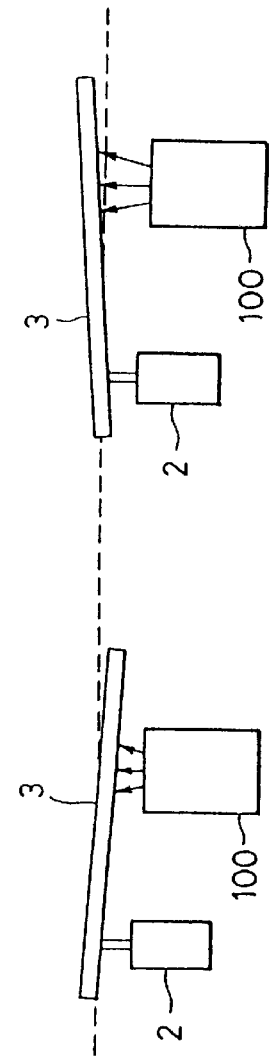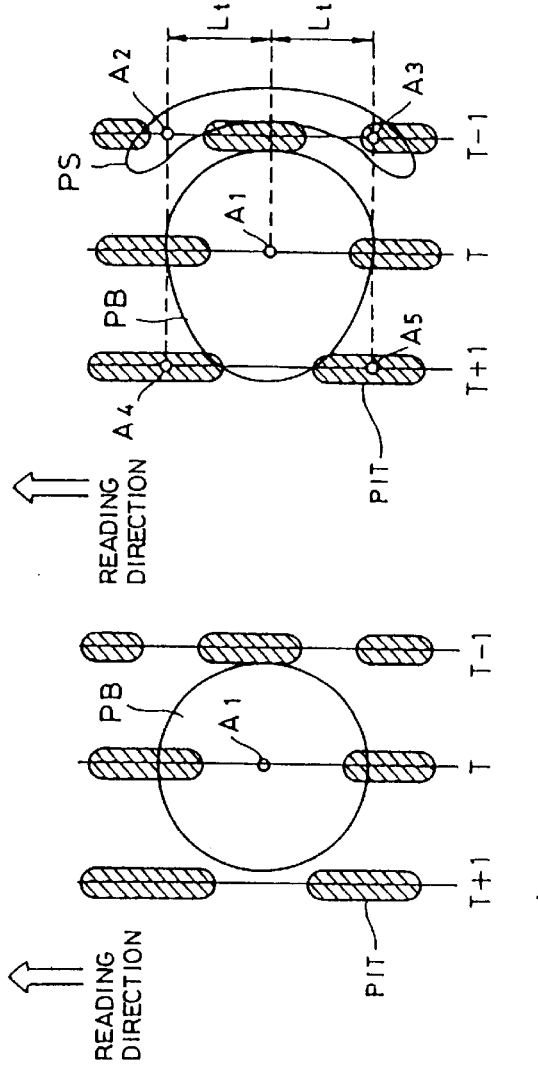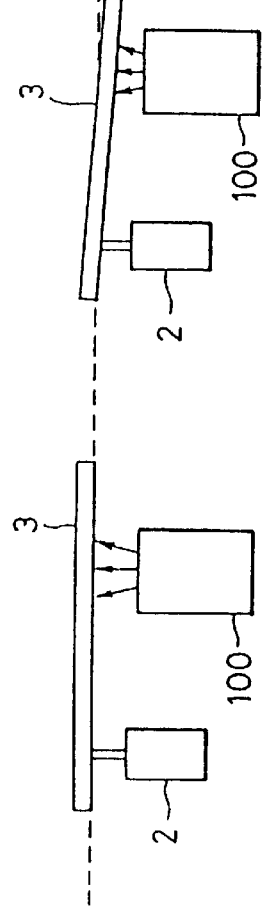
FIG.5  FIG.6  FIG.7

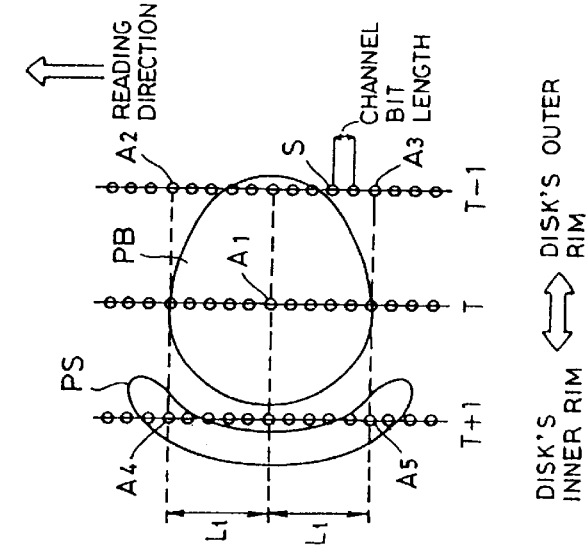
FIG.13
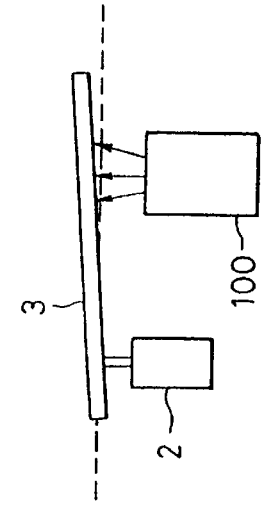
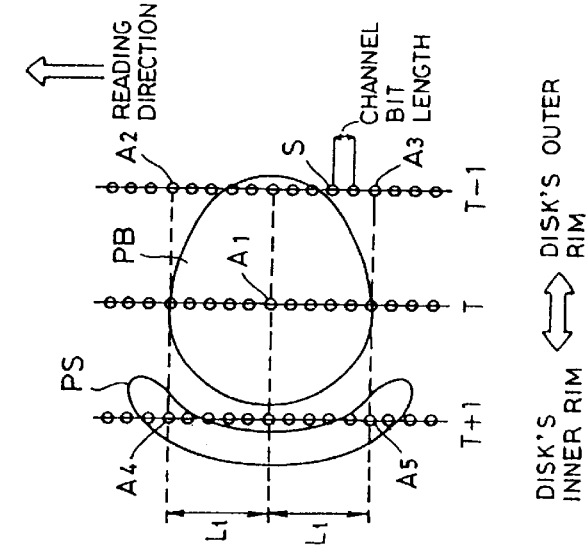
FIG.14
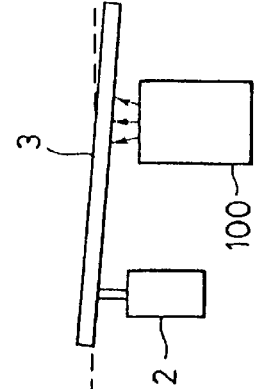
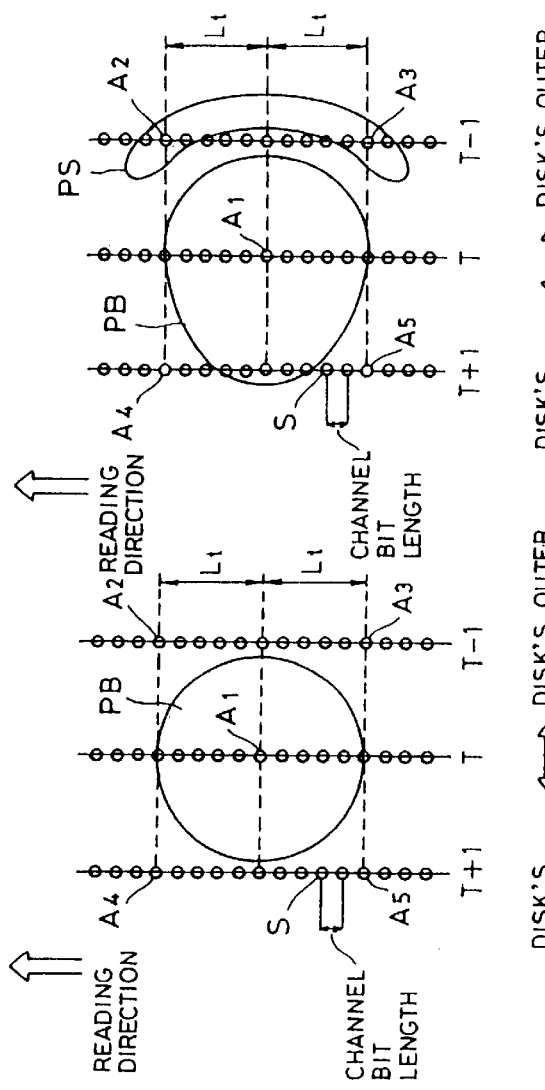
FIG.15
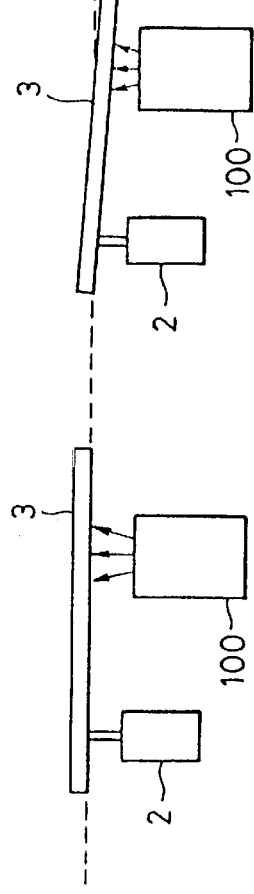

TILT DETECTING METHOD IN RECORDED INFORMATION REPRODUCING APPARATUS

BACKGROUND OF THE INVENTION

1. Field of the Invention

The invention relates to a tilt detecting method in a recorded information reproducing apparatus for detecting a tilt occurring between a recording disk as a recording medium and a pickup to read recorded information from the recording disk.

2. Description of Related Art

To accurately read out recorded information from an optical disk as a recording medium, it is necessary to irradiate a reading beam perpendicularly to the recording surface of the optical disk. However, if the optical disk is warped, the reading beam cannot be irradiated perpendicularly to the recording surface of the optical disk and information reading precision deteriorates.

In recorded information reproducing apparatuses for reproducing the recorded information from the optical disk, a tilt sensor to detect a tilt occurring between the recording disk and the pickup is provided. In such an arrangement, the whole pickup is inclined by an angle corresponding to the tilt detected by the tilt sensor or a desired signal process according to the tilt is performed to the read signal which was read out by the pickup, thereby suppressing the deterioration in information reading precision.

FIG. 1 is a diagram schematically showing a construction in which a tilt sensor 4 is provided in a recorded information reproducing apparatus, to detect a tilt occurring between the recording disk and the pickup as mentioned above.

In FIG. 1, a beam generator 41 in the tilt sensor 4 irradiates divergent light which is irradiated to two different positions on the recording surface of a recording disk 3 which is rotated by a spindle motor 2. A photodetector 42 receives a part of the reflection light when the divergent light is irradiated to the recording surface of the recording disk 3 and supplies a first detection signal having a level according to a photosensitive amount to a subtractor 44. A photodetector 43 is arranged at a position that is symmetrical to the photodetector 42 around the beam generator 41 as a center. The photodetector 43 receives a part of the reflection light when the divergent light is irradiated to the recording surface of the recording disk 3 and supplies a second detection signal having a level according to a photosensitive amount to the subtractor 44. The subtractor 44 obtains a level difference between the first and second detection signals and outputs as a tilt error signal. It is now assumed that each of the beam generator 41 and photodetectors 42 and 43 is arranged on the same parallel plane as that of a pickup (not shown).

Now, if we assume that a parallel relation is maintained between the recording surface of the recording disk 3 and the pickup, since the amounts of reflection light which is received by the photodetectors 42 and 43 are the same, a tilt error signal become equal to "0". If a warp or the like exists in the recording disk 3, the amounts of reflection light which is received by the photodetectors 42 and 43 are different, so that a tilt error signal corresponding to a difference between the reflection light amounts is generated.

If the tilt sensor 4 is provided in the recorded information reproducing apparatus, there however arises a problem that the scale of the apparatus becomes large. Furthermore, upon installation of the tilt sensor in the reproducing apparatus, the tilt sensor 4 has to be accurately attached at the position where the parallel relation between the disk and the pickup is held, so that there is a problem such that high attaching precision is required.

OBJECTS AND SUMMARY OF THE INVENTION

The invention is made to solve those problems and it is an object of the invention to provide a tilt detecting method which can accurately detect a tilt occurring between a recording disk and a pickup by employing a construction of a small scale.

According to the first aspect of the invention, there is provided a tilt detecting method in a recorded information reproducing apparatus, in which a tilt occurring between a recording disk on which information has been recorded and a pickup for photoelectrically converting reflection light when a reading beam is irradiated onto a recording track formed on the recording disk and obtaining a read signal is detected, comprising the steps of: setting a reading position of the pickup for the center recording track among three adjacent recording tracks to a reference; detecting a crosstalk amount, as a first crosstalk, from each of the positions which are displaced forward and rearward from the reading position on the recording track that is neighboring on the disk's inner rim side of the center recording track by a predetermined distance in the reading direction to the reading position; detecting a crosstalk amount, as a second crosstalk, from each of the positions which are displaced forward and rearward from the reading position on the recording track that is neighboring on the disk's outer rim side of the center recording track by a predetermined distance in the reading direction to the reading position; and detecting the tilt occurring between the recording disk and the pickup based on a balance between the first and second crosstalks.

According to the second aspect of the invention, there is provided a tilt detecting method in a recorded information reproducing apparatus, in which a tilt occurring between a recording disk on which information has been recorded and a pickup for photoelectrically converting reflection light when a reading beam is irradiated onto a recording track formed on the recording disk and obtaining a read signal is detected, comprising the steps of: setting a reading position of the pickup for the center recording track among three adjacent recording tracks to a reference; detecting a crosstalk amount, as a first crosstalk, from the position which is displaced forward from the reading position on the recording track that is neighboring on the disk's inner rim side of the center recording track by a predetermined distance in the reading direction to the reading position; detecting a crosstalk amount, as a second crosstalk, from a position which Is displaced forward from the reading position on the recording track that is neighboring on the disk's outer rim side of the center recording track by a predetermined distance in the reading direction to the reading position; and detecting the tilt occurring between the recording disk and the pickup on the basis of a balance between the first and second crosstalks.

According to the third aspect of the invention, there is provided a tilt detecting method in a recorded information reproducing apparatus, in which a tilt occurring between a recording disk on which information has been recorded and a pickup for photoelectrically converting reflection light when a reading beam is irradiated onto a recording track formed on the recording disk and obtaining a read signal is detected, comprising the steps of : setting a reading position of the pickup for the center recording track among three adjacent recording tracks to a reference; detecting a crosstalk amount, as a first crosstalk, from the position which is displaced rearward from the reading position on the recording track that is neighboring on the disk's inner rim side of the center recording track by a predetermined distance in the reading direction to the reading position; detecting a crosstalk amount, as a second crosstalk, from the position which is displaced rearward from the reading position on the recording track that is neighboring on the disk's outer rim side of the center recording track by a predetermined distance in the reading direction to the reading position; and detecting the tilt occurring between the recording disk and the pickup on the basis of a balance between the first and second crosstalks.

BRIEF DESCRIPTION OF THE DRAWINGS

FIGS. 5 to 7 are diagrams each showing a relationship between a tilt between a pickup 100 and the recording disk 3 and a shape of a beam spot which is formed on the recording surface of the recording disk 3;

FIGS. 13 to 15 are diagrams showing examples of sampling timings on recording tracks in each state shown in FIGS. 5 to 7.

DETAILED DESCRIPTION OF THE PREFERRED EMBODIMENTS

An embodiment of the invention will now be described hereinbelow.

Figure 2:
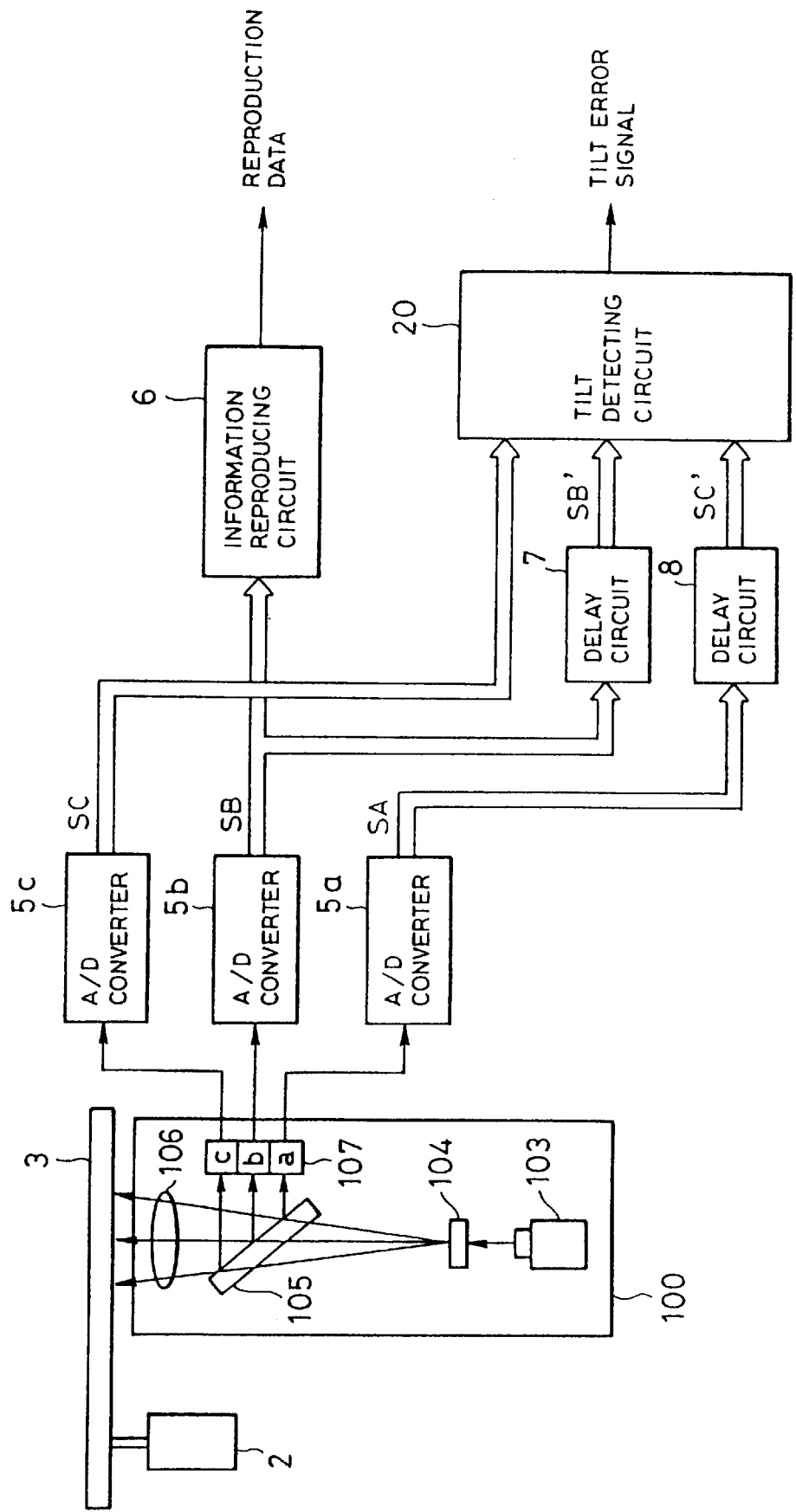
FIG. 2 is a diagram showing a construction of a recorded information reproducing apparatus having a tilt detecting apparatus according to the invention.

FIG. 2 is a diagram showing a recorded information reproducing apparatus having a tilt detecting apparatus which can detect a tilt occurring between a recording disk and a pickup by a tilt detecting method according to the invention.

In FIG. 2, a laser beam generated from a laser oscillator 103 mounted to a pickup 100 serving as information reading means is divided into three information reading beams through a grating 104. The three information reading beams are irradiated to the recording disk 3 through a half mirror 105 and an objective lens 106. Those three information reading beams are irradiated to three recording tracks which are mutually neighboring on the recording surface of the recording disk 3, respectively.

Figure 3:
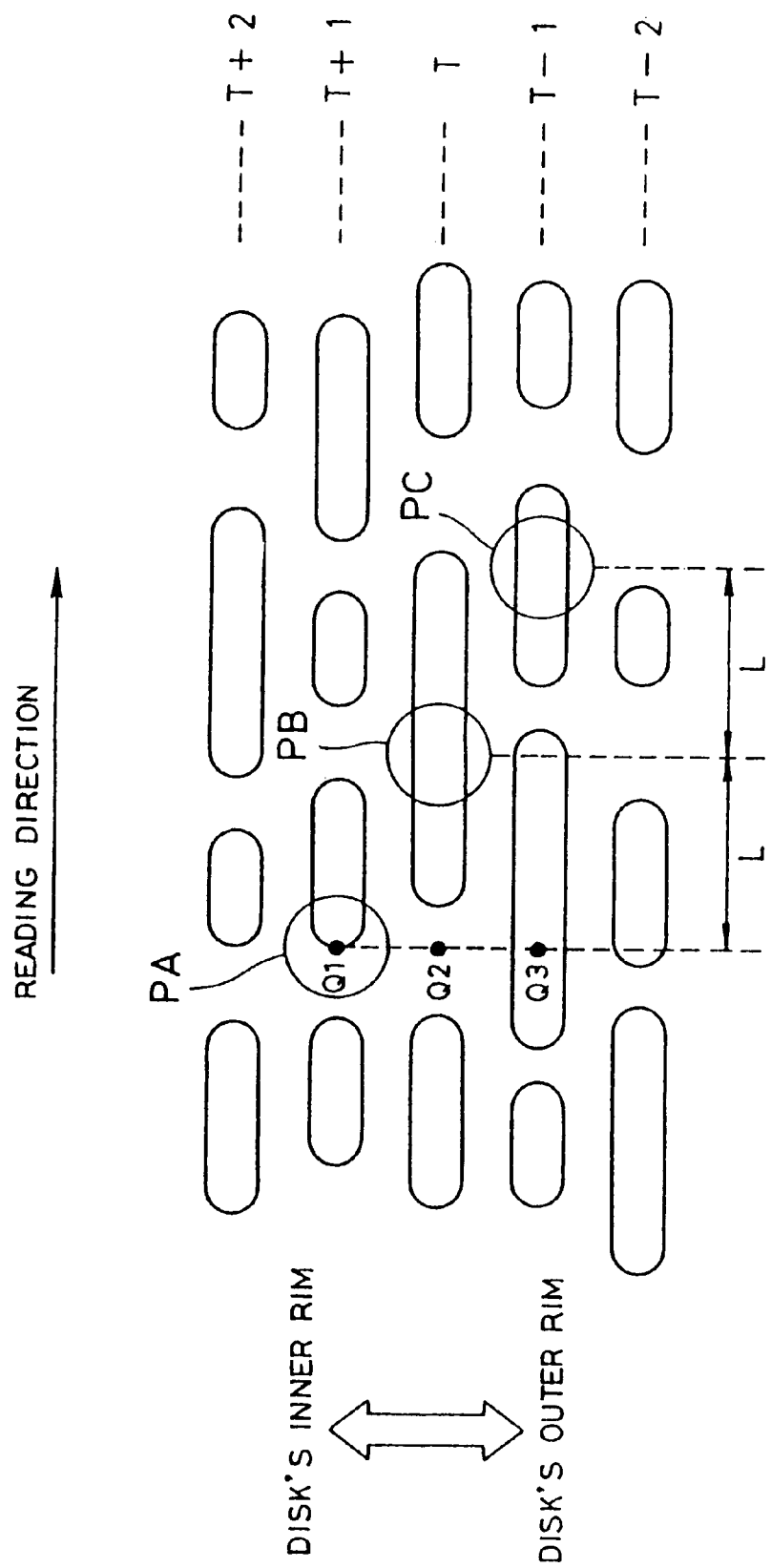
FIG. 3 is a diagram showing a positional relation among beam spots PA to PC and each recording track on a recording disk 3.

FIG. 3 is a diagram showing each of the beam spots which are formed on the recording surface of the recording disk 3 by the three information reading beams.

As shown in FIG. 3, when a center beam spot PB is formed on a track T, a beam spot PA is formed on an adjacent track (T+1). Further, a beam spot PC is formed on an adjacent track (T−1) of the track T.

The reflection lights from the beam spots PA, PB, and PC are irradiated to a photodetector 107 through an objective lens 106 and the half mirror 105. The photodetector 107 is comprised of independent photodetectors 107a to 107c.

The photodetector 107a supplies a read signal obtained by photoelectrically converting the reflection light from the beam spot PA supplied through the half mirror 105 to an A/D converter 5a. The photodetector 107b supplies a read signal obtained by photoelectrically converting the reflection light from the beam spot PB supplied through the half mirror 105 to an A/D converter 5b. The photodetector 107c supplies a read signal obtained by photoelectrically converting the reflection light from the beam spot PC supplied through the half mirror 105 to an A/D converter 5c.

As shown in FIG. 3, it is assumed that the beam spots PA and PB are displaced from each other by a distance L in the reading direction and the beam spots PB and PC are also displaced from each other by the distance L.

The A/D converters 5a to 5c sequentially samples the read signals supplied from the photodetectors 107a to 107c and obtain read sampling value sequences SA to SC, respectively.

An information reproducing circuit 6 reproduces the information data recorded on the recording disk 3 on the basis of the read sampling value sequence SB and outputs the reproduction data derived here.

A delay circuit 7 supplies a delayed read sampling value sequence SB' obtained by delaying the read sampling value sequence SB by the (L/V) time to a tilt detecting circuit 20. A delay circuit 8 supplies a delayed read sampling value sequence SC' obtained by delaying the read sampling value sequence SC by the 2·(L/V) time to the tilt detecting circuit 20. The read sampling value sequence SA generated from the A/D converter 5a is directly supplied to the tilt detecting circuit 20.

Each of the delay circuits 7 and 8 comprises, for example, an FIFO (First-in First-out) memory or the like and sequentially fetches the supplied read sampling value sequence to registers of n stages every sampling timing in the A/D converter and outputs it while shifting every timing of a predetermined reference clock signal, thereby giving the delay as mentioned above to each of the read sampling value sequences SB and SC.

"L" denotes the distance between the beam spots PB and PC (PA) as shown in FIG. 3. "V" denotes a reading linear velocity of the pickup 100 for the recording disk 3.

That is, in the case where the read sampling value sequence SA supplied to the tilt detecting circuit 20 has the value derived when performing the reading operation at a position $Q_1$ on the recording track (T+1) on the recording disk 3 as shown in FIG. 3, the delayed read sampling value sequence SB' has the value obtained when performing the reading operation at a position $Q_2$ on the recording track T. The delayed read sampling value sequence SC' has the value obtained when performing the reading operation at a position $Q_3$ on the recording track (T−1). At this time, as shown in FIG. 3, each of the positions $Q_1$ to $Q_3$ exists on the same radial line on the recording disk 3.

That is, the read sampling value sequences (SA, SB', SC') of three systems read out from the respective positions existing on the same radial line of the three adjacent recording tracks are supplied to the tilt detecting circuit 20.

The tilt detecting circuit 20 detects a tilt between the pickup 100 and recording disk 3 on the basis of each of the read sampling value sequences SA to SC and outputs a tilt error signal having the level according to this tilt.

Figure 4:
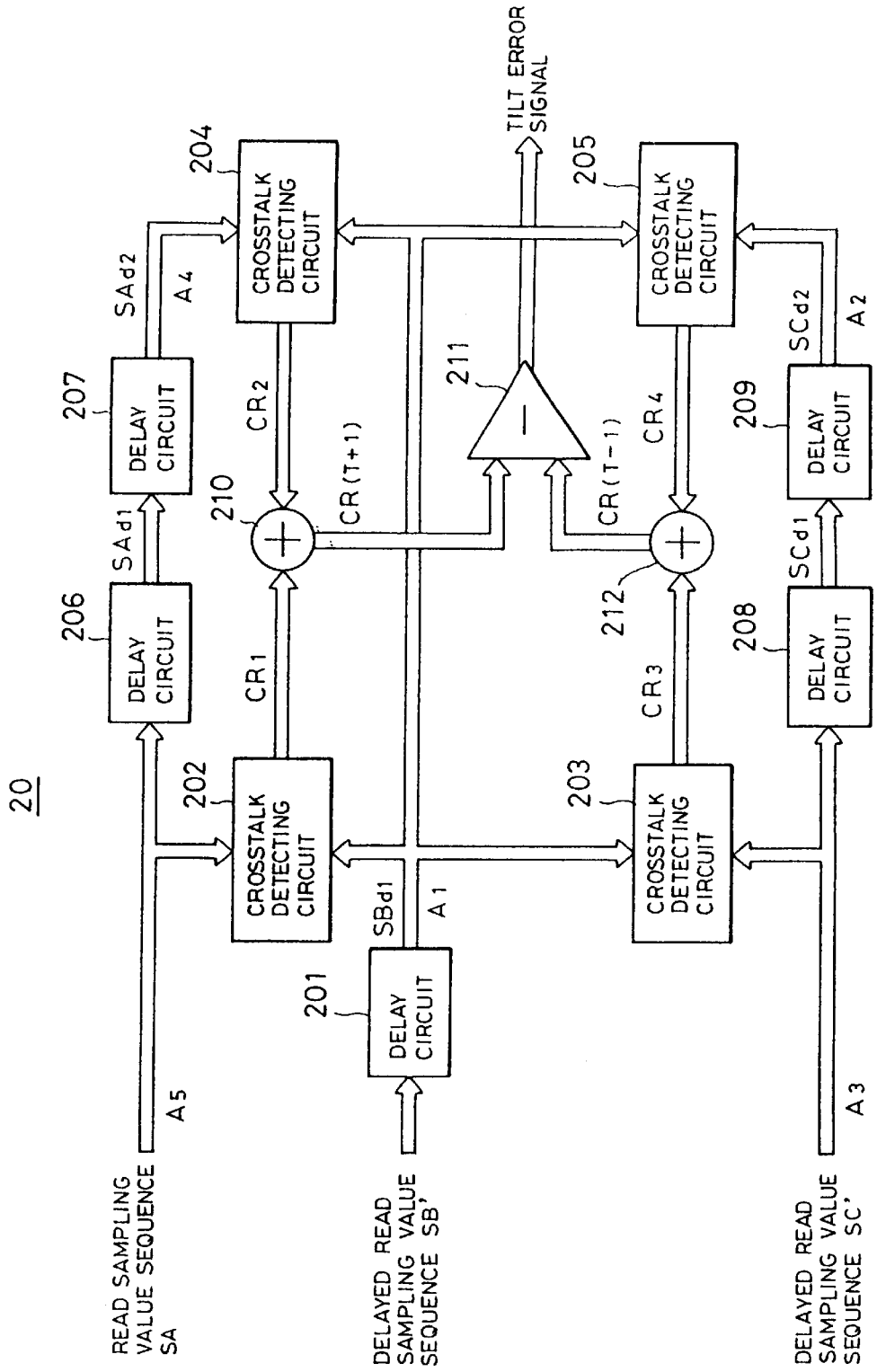
FIG. 4 is a diagram showing an example of an internal construction of a tilt detecting circuit 20 according to the invention.

FIG. 4 is a diagram showing an internal construction of the tilt detecting circuit 20.

In FIG. 4, a delay circuit 201 further delays the delayed read sampling value sequence SB' by a predetermined time t (which will be explained later) and supplies the delayed sequence as a delayed read sampling value sequence $SB_{d1}$ to each of crosstalk detecting circuits 202 to 205. The crosstalk detecting circuit 202 obtains a correlation between, for example, the delayed read sampling value sequence $SB_{d1}$ and the read sampling value sequence SA, thereby detecting a crosstalk amount based on the read sampling value sequence SA multiplexed to the delayed read sampling value sequence $SB_{d1}$. The crosstalk detecting circuit 202 supplies a crosstalk detection signal $CR_1$ corresponding to the crosstalk amount to an adder 210. A delay circuit 206 delays the read sampling value sequence SA by the predetermined time t and supplies the delayed sequence as a delayed read sampling value sequence $SA_{d1}$ to a delay circuit 207. The delay circuit 207 further delays the delayed read sampling value sequence $SA_{d1}$ by the predetermined time t and supplies the delayed sequence as a delayed read sampling value sequence $SA_{d2}$ to the crosstalk detecting circuit 204. The crosstalk detecting circuit 204 obtains a correlation between, for example, the delayed read sampling value sequence $SB_{d1}$ and the delayed read sampling value sequence $SA_{d2}$, thereby detecting a crosstalk amount based on the delayed read sampling value sequence $SA_{d2}$ multiplexed to the delayed read sampling value sequence $SB_{d1}$. The crosstalk detecting circuit 204 supplies a crosstalk detection signal $CR_2$ corresponding to the crosstalk amount to the adder 210. The adder 210 adds the crosstalk detection signals $CR_1$ and $CR_2$ and supplies a resultant signal as a first crosstalk $CR_{(T+1)}$ from the adjacent track (T+1) to a subtractor 211 as shown in FIG. 3.

The crosstalk detecting circuit 203 obtains a correlation between, for example, the delayed read sampling value sequence $SB_{d1}$ and the read sampling value sequence SC', thereby detecting a crosstalk amount based on the read sampling value sequence SC' multiplexed to the delayed read sampling value sequence $SB_{d1}$. The crosstalk detecting circuit 203 supplies a crosstalk detection signal $CR_3$ corresponding to the crosstalk amount to an adder 212. A delay circuit 208 delays the read sampling value sequence SC' by the predetermined time t and supplies the delayed sequence as a delayed read sampling value sequence $SC_{d1}$ to a delay circuit 209. The delay circuit 209 further delays the delayed read sampling value sequence $SC_{d1}$ by the predetermined time t and supplies the delayed sequence as a delayed read sampling value sequence $SC_{d2}$ to the crosstalk detecting circuit 205. The crosstalk detecting circuit 205 obtains a correlation between, for example, the delayed read sampling value sequence $SB_{d1}$ and the delayed read sampling value sequence $SC_{d2}$, thereby detecting a crosstalk amount based on the delayed read sampling value sequence $SC_{d2}$ multiplexed to the delayed read sampling value sequence $SB_{d1}$. The crosstalk detecting circuit 205 supplies a crosstalk detection signal $CR_4$ corresponding to the crosstalk amount to the adder 212. The adder 212 adds the crosstalk detection signals $CR_3$ and $CR_4$ and supplies a resultant signal as a second crosstalk $CR_{(T-1)}$ from the adjacent track (T-1) to the subtractor 211 as shown in FIG. 3.

The subtractor 211 obtains a difference between the first crosstalk $CR_{(T+1)}$ and second crosstalk $CR_{(T-1)}$ and outputs as a tilt error signal corresponding to an angle of inclination between the pickup 100 and recording disk 3.

The operation of the tilt detecting circuit 20 will now be described hereinbelow with reference to FIGS. 5 to 7.

FIG. 5 is a diagram showing an intensity distribution of the beam spot PB which is formed when the information reading beam from the pickup 100 is irradiated to a position $A_1$ on the recording track T in the case where no tilt occurs between the pickup 100 and the recording surface of the recording disk 3 and shows the distribution when the beam spot is sliced by a predetermined intensity.

As shown in FIG. 5, when no tilt occurs between the pickup 100 and the recording surface of the recording disk 3, the beam spot PB of an almost perfect circle is formed. Since the beam spot PB is not irradiated to both of the recording track (T+1) adjacent to the disk's inner rim side of the recording track T and the recording track (T-1) adjacent to the disk's outer rim side, the crosstalk components from both of those tracks are equal to "0".

When a tilt as shown in FIG. 6 occurs between the pickup 100 and the recording surface of the recording disk 3, the beam spot PB which is formed when the information reading beam from the pickup 100 is irradiated to the position $A_1$ on the recording track T has a form extending on the disk's inner rim side. Further, a side lobe PS as shown in FIG. 6 is formed on the disk's outer rim side rather than the recording track T. The side lobe PS irradiates parts on the recording track (T-1), namely, positions $A_2$ and $A_3$ on the recording track (T-1) which are displaced forward and rearward from the position $A_1$ on the recording track T by a distance $L_t$ in the reading direction, respectively. Due to an influence by the side lobe PS as shown in FIG. 6, therefore, the crosstalk components from the positions $A_2$ and $A_3$ on the recording track (T-1) are multiplexed into the read sampling value sequence SB obtained by reading the recorded information from the position $A_1$ on the recording track T by the pickup 100. In the state as shown in FIG. 6, no beam is irradiated to positions $A_4$ and $A_5$ on the recording track (T+1) which are displaced forward and rearward from the position $A_1$ on the recording track T by the distance $L_t$ in the reading direction. Consequently, the crosstalk component from each of the positions $A_4$ and $A_5$ on the recording track (T+1) does not exist in the read sampling value sequence SB.

When a tilt as shown in FIG. 7 occurs between the pickup 100 and the recording surface of the recording disk 3, the beam spot PB which is formed when the information reading beam from the pickup 100 is irradiated to the position $A_1$ on the recording track T has a form extending on the disk's outer rim side. Further, a side lobe PS as shown in FIG. 7 is formed on the disk's inner rim side rather than the recording track T. The side lobe PS irradiates parts on the recording track (T+1), namely, positions $A_4$ and $A_5$ on the recording track (T+1) which are displaced forward and rearward from the position $A_1$ on the recording track T by a distance $L_t$ in the reading direction, respectively. Due to an influence by the side lobe PS as shown in FIG. 7, therefore, the crosstalk components from the positions $A_4$ and $A_5$ on the recording track (T+1) are multiplexed into the read sampling value sequence SB obtained by reading the recorded information from the position $A_1$ on the recording track T by the pickup 100. In the state as shown in FIG. 7, no beam is irradiated to positions $A_2$ and $A_3$ on the recording track (T-1) which are displaced forward and rearward from the position $A_1$ on the recording track T by the distance $L_t$ in the reading direction. Consequently, the crosstalk component from each of the positions $A_2$ and $A_3$ on the recording track (T-1) does not exist in the read sampling value sequence SB.

Actually, $L_t$ shows a range where the side lobe PS irradiates the adjacent recording track and there are the following relations.

$$\{(0.65 \times \lambda/NA)^2 - Tp^2\}^{1/2} < L_t < \{(\lambda/NA)^2 - Tp^2\}^{1/2}$$

where, $\lambda$: wavelength of reading beam

NA: numerical aperture of the objective lens 106

Tp: pitch between the recording tracks

When the tilt as shown in FIG. 6 or 7 exists between the pickup 100 and the recording surface of the recording disk 3, the crosstalks from the positions $A_2$ and $A_3$ or the positions $A_4$ and $A_5$ on the adjacent track which are displaced forward and rearward from the position $A_1$ by the distance $L_t$ in the reading direction are multiplexed to the read signal read out from the position $A_1$ on the recording track T, respectively.

The tilt detecting circuit 20 shown in FIG. 4 detects a tilt on the basis of a differential value between the first crosstalk $CR_{(T+1)}$ from each of the positions $A_2$ and $A_3$ on the recording track (T-1) that is neighboring on the disk's outer rim side of the center recording track T among the three adjacent recording tracks (T+1), T, and (T-1) and the second crosstalk $CR_{(T-1)}$ from each of the positions $A_4$ and $A_5$ on the recording track (T+1) that is neighboring on the disk's inner rim side.

Even when no tilt occurs between the pickup 100 and the recording surface of the recording disk 3, the crosstalk from each of the recording tracks (T-1) and (T+1) adjacent to the recording track T is not equal to "0" under a situation such that "the pit is thick", "the track pitch is narrow", "a spherical aberration occurs", or the like. For example, when the spherical aberration occurs, the beam spot irradiates all of the positions $A_2$, $A_3$, $A_4$, and $A_5$ and the crosstalks from the positions $A_2$ and $A_3$ and the crosstalks from the positions $A_4$ and $A_5$ are detected. Balances, however, between the crosstalks from the positions $A_2$ and $A_3$ and the crosstalks from the positions $A_4$ and $A_5$ are almost equal. Accordingly, even if a difference between the first crosstalk $CR_{(T+1)}$ and the second crosstalk $CR_{(T-1)}$ is obtained, no tilt error occurs.

Further, even if the crosstalks from the positions $A_4$ and $A_5$ are detected by defocusing or the like in FIG. 6, if a difference between the first crosstalk $CR_{(T+1)}$ and the second crosstalk $CR_{(T-1)}$ is obtained, only the influence by the side lobe due to the inclination of the disk is detected as a tilt error. The above point shall also similarly apply to the case of FIG. 7.

First, the predetermined time t as a delay time of the delay circuit 201 and the delay circuits 206 to 209 in FIG. 4 is Predetermined time $t = L_t/V$ where, V: reading linear velocity When the read sampling value obtained in the case where the pickup 100 reads the recorded information from the position $A_1$ on the recording track T as shown in FIGS. 5 to 7 appears in the output ($SB_{d1}$) of the delay circuit 201 in FIG. 4, the read sampling value sequences are as follows.

$SB_{d1}$=read sampling value from the position $A_1$ on the recording track T $SC_{d2}$=read sampling value from the position $A_2$ on the recording track (T-1)

SC'=read sampling value from the position $A_3$ on the recording track (T-1)

$SA_{d2}$=read sampling value from the position $A_4$ on the recording track (T+1)

SA=read sampling value from the position $A_5$ on the recording track (T+1)

When the tilt of the recording disk 3 for the pickup 100 is in a state as shown in FIG. 6, the crosstalks from the positions $A_2$ and $A_3$ on the recording track (T-1) are multiplexed to the read sampling value from the position $A_1$ on the recording track T. The crosstalk detecting circuits 202 and 204 in FIG. 4 supply the crosstalk detection signals $CR_1$ and $CR_2$ having positive values according to those crosstalk amounts to the adder 210, respectively. The adder 210 supplies a signal obtained by adding the crosstalk detection signals $CR_1$ and $CR_2$ having positive values to the subtractor 211 as a first crosstalk $CR_{(T+1)}$ from the recording track (T+1). In the state of FIG. 6, since there is no influence by the crosstalks from the positions $A_4$ and $A_5$ on the recording track (T+1), the crosstalk detecting circuits 203 and 205 in FIG. 4 supply the crosstalk detection signals $CR_3$ and $CR_4$ at the "0" level showing the absence of the crosstalks to the adder 212, respectively. The adder 212, therefore, supplies a signal obtained by adding the crosstalk detection signals $CR_3$ and $CR_4$ at the "0" level to the subtractor 211 as a second crosstalk $CR_{(T-1)}$ from the recording track (T-1). The subtractor 211 subtracts the second crosstalk $CR_{(T-1)}$ at the "0" level from the first crosstalk $CR_{(T+1)}$ having the positive value as mentioned above.

When the recording disk 3 and pickup 100 are in the tilting state as shown in FIG. 6, therefore, the tilt error signal of the positive value is generated from the tilt detecting circuit 20 as shown in FIG. 4.

In case of the tilting state as shown in FIG. 7, the crosstalks from the positions $A_4$ and $A_5$ on the recording track (T+1) are multiplexed to the read sample from the position $A_1$ on the recording track T. In this case, on the contrary to the case of FIG. 6 mentioned above, the second crosstalk $CR_{(T-1)}$ from the recording track (T-1) is equal to the "0" level and the first crosstalk $CR_{(T+1)}$ from the recording track (T+1) has the positive value.

When the recording disk 3 and pickup 100 are in the tilting state as shown in FIG. 7, therefore, the tilt error signal of the negative value is generated from the tilt detecting circuit 20 as shown in FIG. 4.

As mentioned above, the tilt detecting circuit 20 outputs the tilt error signal of the positive value when the tilt as shown in FIG. 6 exists between the recording disk 3 and pickup 100 and outputs the tilt error signal of the negative value when there is the tilt as shown in FIG. 7. The direction of the tilt occurring between the recording disk 3 and pickup 100 can be discriminated on the basis of the polarity of the tilt error signal.

Figure 1:
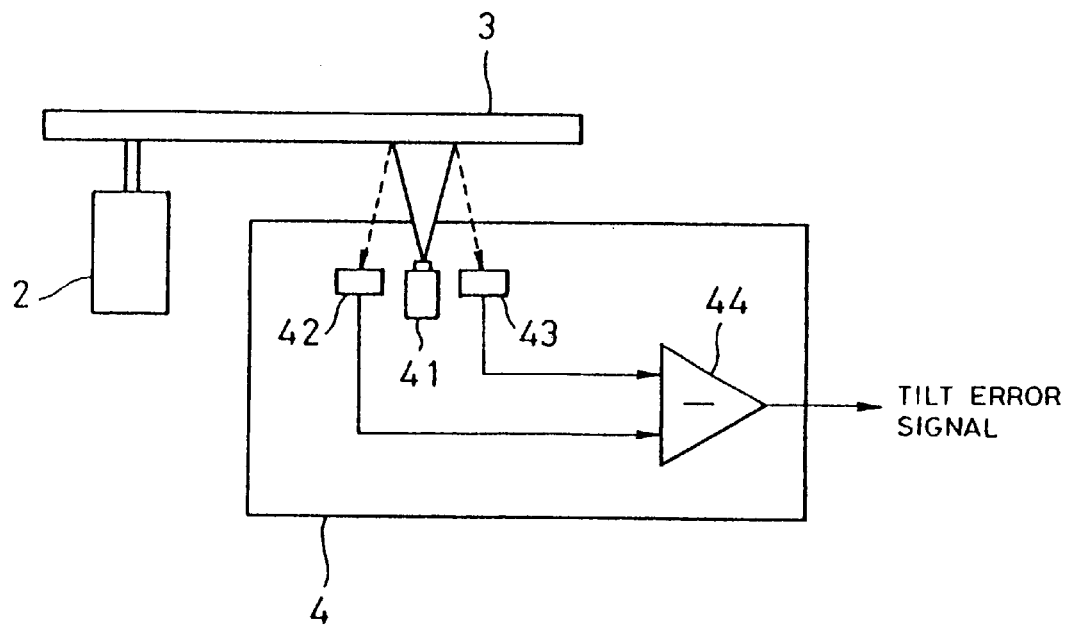
FIG. 1 is a diagram showing an example of a construction of a recorded information reproducing apparatus having a tilt sensor 4.

According to the tilt detecting circuit 20, therefore, even if the tilt sensor 4 as shown in FIG. 1 is not used, the tilt can be detected on the basis of the read signal read out from the recording disk, so that the apparatus scale of the whole information reproducing apparatus can be reduced.

In the tilt detecting circuit 20 shown in FIG. 4, even if a tracking offset occurs in the pickup 100, the tilt can be accurately detected.

Figure 8:
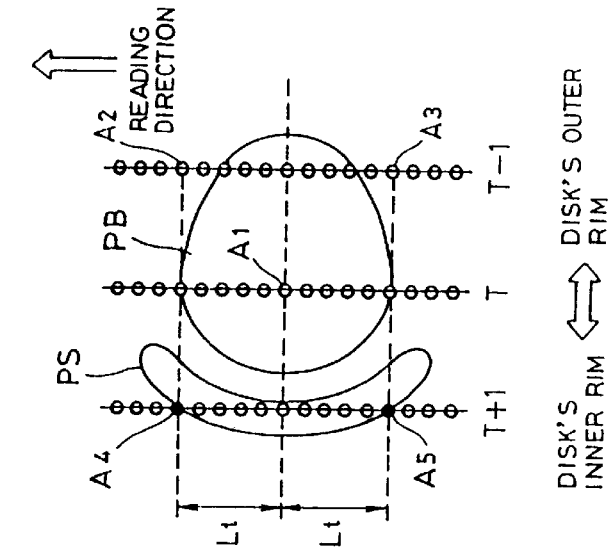
FIGS. 8 to 10 are diagrams each showing a forming position of the beam spot in the case where a tracking offset occurs.
Figure 9:
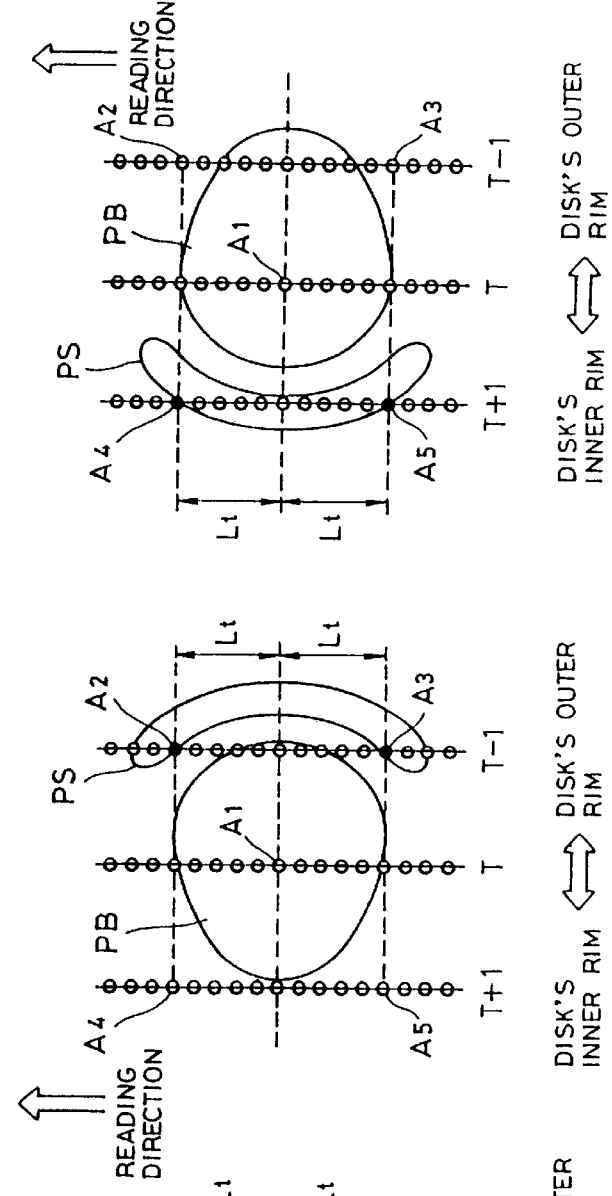
Figure 10:
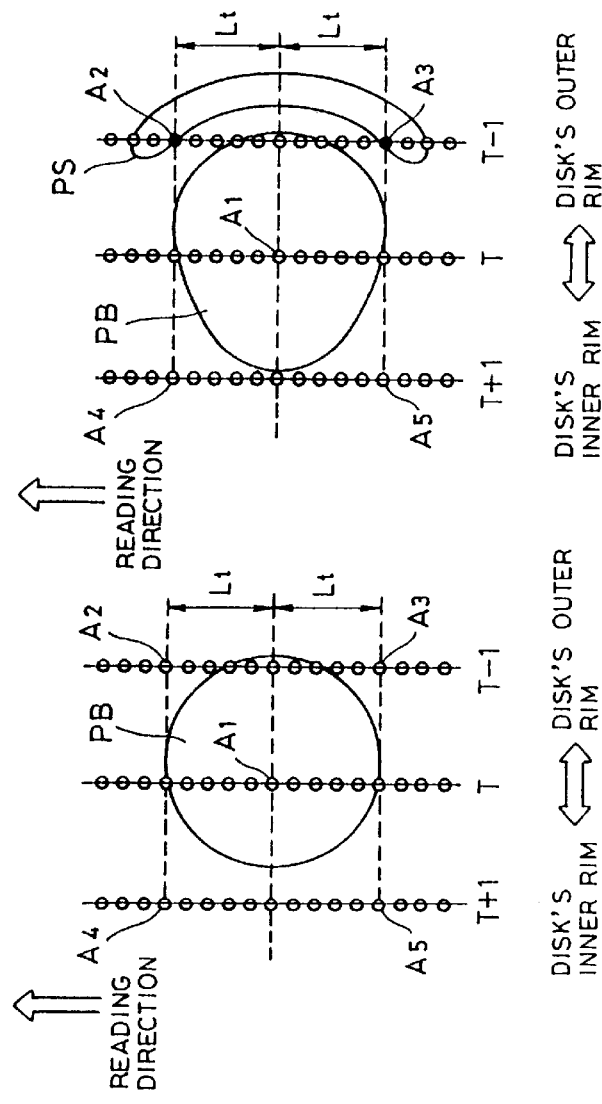

For instance, each of FIGS. 8 to 10 is a diagram showing a forming position of the beam spot PB in the case where the beam spot PB is tracking offset in the disk's outer rim direction in each state of FIGS. 5 to 7.

Even if a slight tracking offset occurs as mentioned above, the irradiating state of the side lobe PS (whether it has been irradiated or not) at each of the positions $A_2$ and $A_3$ on the recording track (T−1) and the positions $A_4$ and $A_5$ on the recording track (T+1) is not changed from that in case of FIG. 5. Even in the case where the tracking offsets as shown in FIGS. 8 to 10 occur, therefore, the tilt detecting circuit 20 shown in FIG. 4 can perform the tilt detection in a manner similar to the cases of FIGS. 5 to 7.

As mentioned above, in the tilt detecting circuit 20 shown in FIG. 4, first, the reading position ($A_1$) of the pickup for the center recording track T among the three neighboring recording tracks is set to a reference. A crosstalk amount ($CR_{(T+1)}$) from each of the positions ($A_4$ and $A_5$) which are displaced forward and rearward from the reading position ($A_1$) on the recording track (T+1) which is neighboring on the disk's inner rim side of the center recording track T by the predetermined distance ($L_t$) in the reading direction is obtained. Further, a crosstalk amount ($CR_{(T-1)}$) from each of the positions ($A_2$ and $A_3$) which are displaced forward and rearward from the reading position ($A_1$) on the recording track (T−1) which is neighboring on the disk's outer rim side by the predetermined distance ($L_t$) in the reading direction is obtained. Subsequently, the magnitude balance between both of the crosstalk amounts is discriminated by the difference between them. On the basis of this balance, the tilt occurring between the recording disk and the pickup is detected.

The tilt detecting circuit 20, however, is not limited to the above construction.

Figure 11:
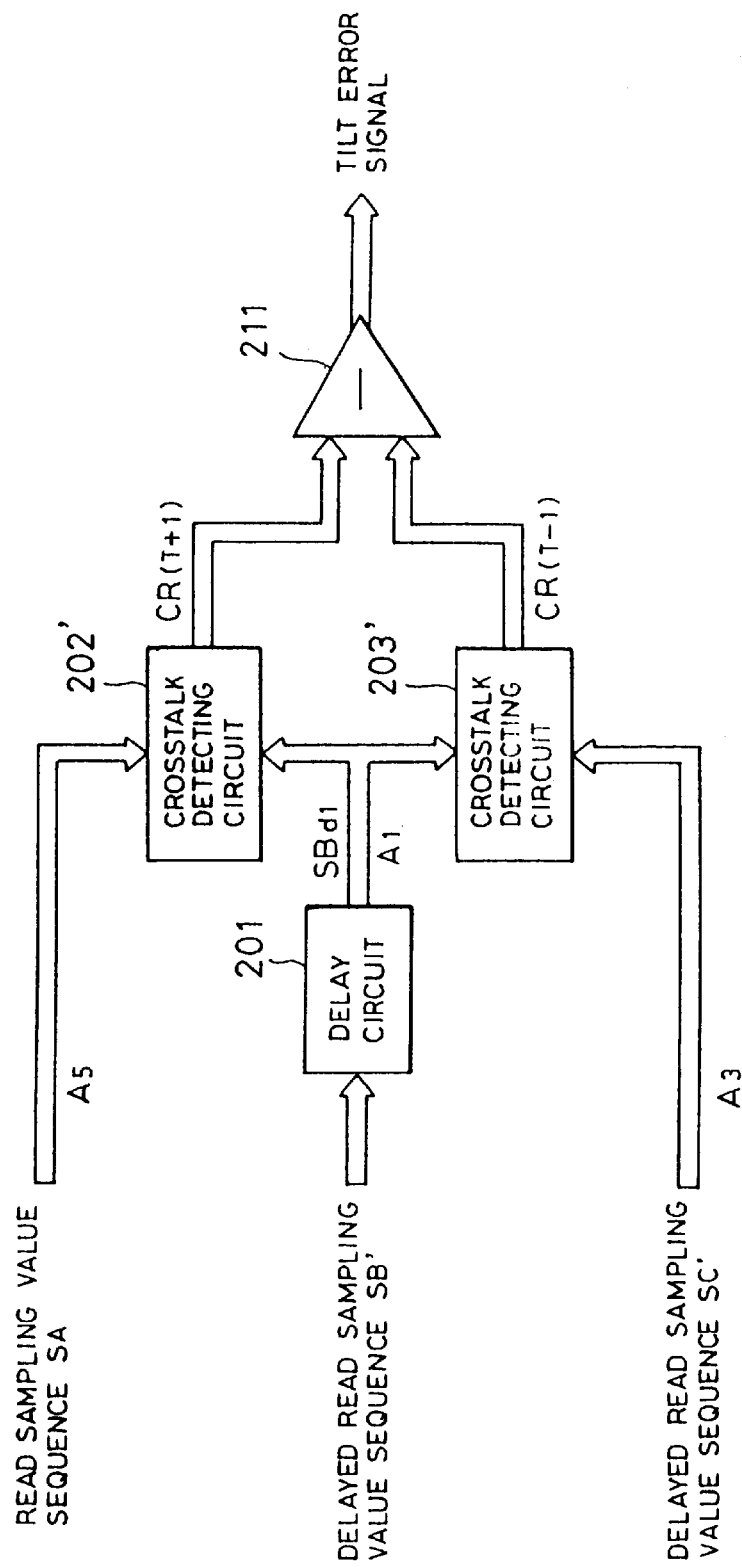
FIG. 11 is a diagram showing an internal construction according to another embodiment of the tilt detecting circuit 20.

FIG. 11 is a diagram showing an internal construction according to another embodiment of the tilt detecting circuit 20 made in consideration of the above point.

In FIG. 11, the delay circuit 201 delays the delayed read sampling value sequence SB' by the predetermined time t as mentioned above and supplies the delayed sequence as a delayed read sampling value sequence $SB_{d1}$ to each of crosstalk detecting circuits 202' and 203'. The crosstalk detecting circuit 202' obtains, for instance, a correlation between the delayed read sampling value sequence $SB_{d1}$ and read sampling value sequence SA, thereby detecting the crosstalk amount based on the read sampling value sequence SA multiplexed to the delayed read sampling value sequence $SB_{d1}$. The crosstalk detecting circuit 202' supplies a signal having the level corresponding to such a crosstalk amount to the subtractor 211 as a first crosstalk $CR_{(T+1)}$ from the adjacent recording track (T+1). The crosstalk detecting circuit 203' obtains, for instance, a correlation between the delayed read sampling value sequence $SB_{d1}$ and delayed read sampling value sequence SC', thereby detecting the crosstalk amount based on the delayed read sampling value sequence SC' multiplexed to the delayed read sampling value sequence $SB_{d1}$. The crosstalk detecting circuit 203' supplies a signal having the level corresponding to such a crosstalk amount to the subtractor 211 as a second crosstalk $CR_{(T-1)}$ from the adjacent recording track (T−1). The subtractor 211 obtains a difference between the first crosstalk $CR_{(T+1)}$ and second crosstalk $CR_{(T-1)}$ and outputs it as a tilt error signal corresponding to the angle of inclination between the pickup 100 and recording disk 3.

In the above construction, the predetermined time t serving as a delay time of the delay circuit 201 is Predetermined time $t=L_t/V$ where, V: reading linear velocity Therefore, when the read sampling value obtained in the case where the pickup 100 reads the recorded information from the position $A_1$ on the recording track T as shown in FIGS. 5 to 7 appears in the output ($SB_{d1}$) of the delay circuit 201 in FIG. 11, the sampling value sequences are as follows.

$SB_{d1}$=read sampling value from the position $A_1$ on the recording track T

SC'=read sampling value from the position $A_3$ on the recording track (T−1)

SA=read sampling value from the position $A_5$ on the recording track (T+1)

That is, the tilt detecting circuit 20 shown in FIG. 11 detects the tilt by the magnitude balance between the crosstalk amount from the position ($A_3$) that is displaced rearward from the position ($A_1$) on the recording track (T−1) by the predetermined distance ($L_t$) in the reading direction and the crosstalk amount from the position ($A_5$) that is displaced rearward from the position ($A_1$) on the recording track (T+1) by the predetermined distance ($L_t$) in the reading direction.

The tilt detecting circuit 20 can also perform the tilt detection by the magnitude balance of the crosstalk amount from each of the positions ($A_2$ and $A_4$) which are displaced forward from the position ($A_1$) by the predetermined distance ($L_t$) in the reading direction on each of the adjacent tracks.

Figure 12:
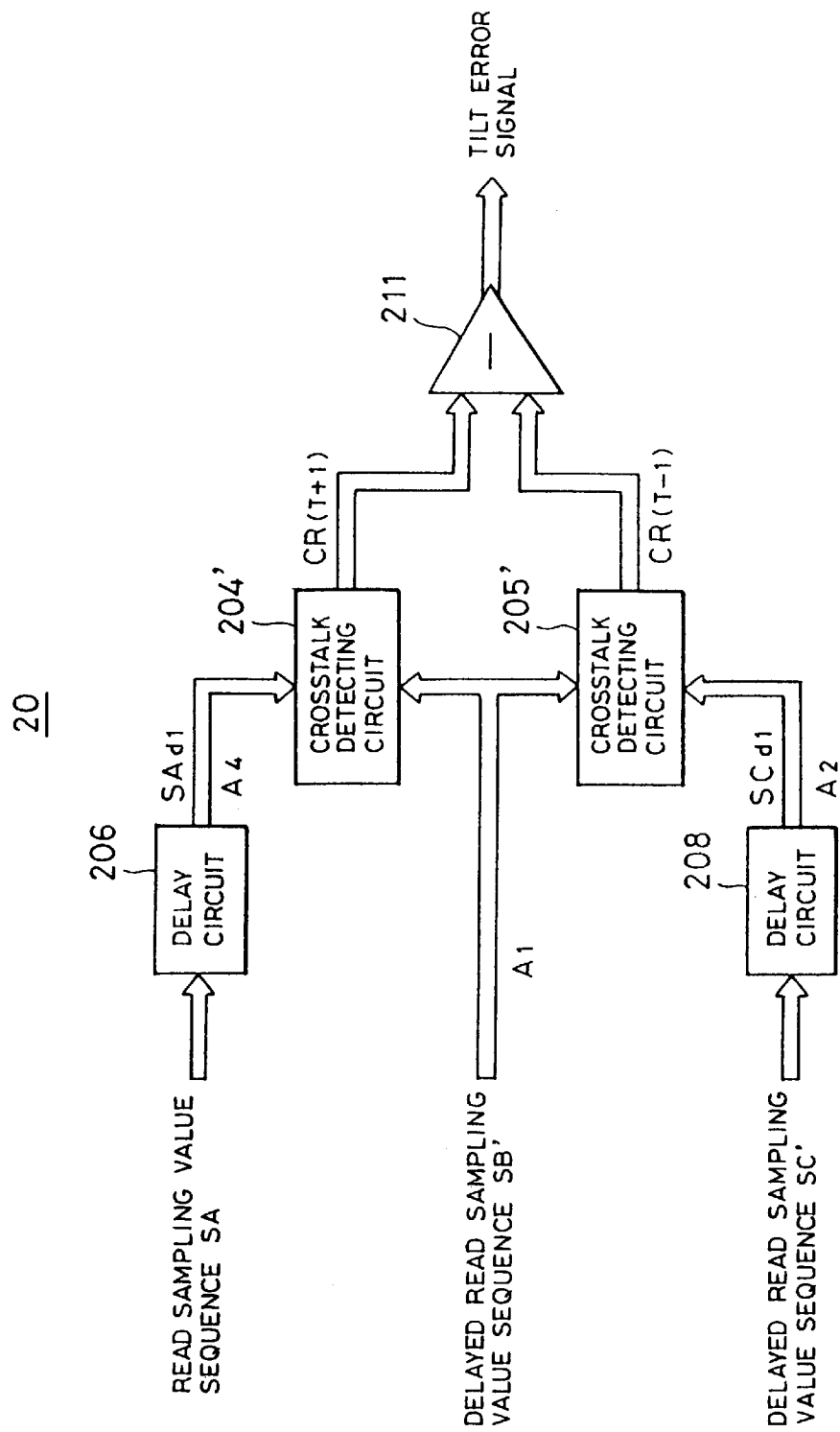
FIG. 12 is a diagram showing an internal construction according to still another embodiment of the tilt detecting circuit 20.

FIG. 12 is a diagram showing an internal construction according to another embodiment of the tilt detecting circuit 20 to embody the above operation.

In FIG. 12, the delay circuit 206 delays the read sampling value sequence SA by the predetermined time t and supplies the delayed sequence as a delayed read sampling value sequence $SA_{d1}$ to a crosstalk detecting circuit 204'. The crosstalk detecting circuit 204' obtains, for example, a correlation between the delayed read sampling value sequence SB' and the delayed read sampling value sequence $SA_{d1}$, thereby detecting the crosstalk amount based on the delayed read sampling value sequence $SA_{d1}$ multiplexed to the delayed read sampling value sequence SB'. The crosstalk detecting circuit 204' supplies a signal having the level corresponding to such a crosstalk amount to the subtractor 211 as a first crosstalk $CR_{(T+1)}$ from the adjacent recording track (T+1). The delay circuit 208 delays the read sampling value sequence SC' by the predetermined time t and supplies the delayed sequence as a delayed read sampling value sequence $SC_{d1}$ to a crosstalk detecting circuit 205'. The crosstalk detecting circuit 205', for example, obtains a correlation between the delayed read sampling value sequence SB' and the delayed read sampling value sequence $SC_{d1}$, thereby detecting the crosstalk amount based on the delayed read sampling value sequence $SC_{d1}$ multiplexed to the delayed read sampling value sequence SB'. The crosstalk detecting circuit 205' supplies a signal having the level corresponding to such a crosstalk amount to the subtractor 211 as a second crosstalk $CR_{(T-1)}$ from the adjacent recording track (T−1). The subtractor 211 obtains a difference between the first crosstalk $CR_{(T+1)}$ and the second crosstalk $CR_{(T-1)}$ and outputs it as a tilt error signal corresponding to the angle of inclination between the pickup 100 and recording disk 3.

In the above construction, the predetermined time t serving as a delay time of each of the delay circuits 206 and 208 is Predetermined time $t=L_t/V$ where, V: reading linear velocity Therefore, when the read sampling value obtained in the case where the pickup 100 reads the recorded information from the position $A_1$ on the recording track T as shown in FIGS. 5 to 7 appears in the delayed read sampling value sequence SB', the sampling value sequences are as follows.

SB'=read sampling value from the position $A_1$ on the recording track T $SA_{d1}$=read sampling value from the position $A_4$ on the recording track (T+1)

$SC_{d1}$=read sampling value from the position $A_2$ on the recording track (T−1)

That is, in the construction shown in FIG. 12, the tilt detection is performed by the magnitude balance between the crosstalk amount from the position ($A_2$) that is displaced forward from the position ($A_1$) on the recording track (T−1) by the predetermined distance ($L_t$) in the reading direction and the crosstalk amount from the position ($A_4$) that is displaced forward from the position ($A_1$) on the recording track (T+1) by the predetermined distance ($L_t$) in the reading direction.

In the embodiment, although the magnitude balance between the crosstalk amount from the recording track (T−1) and the crosstalk amount from the recording track (T+1) is discriminated by the difference between them, it can be also discriminated by a ratio between them.

Each of the delay circuits 201 and 206 to 209 shown in FIG. 4 can be constructed by, for example, an FIFO (First-in First-out) memory or the like.

The read sampling value sequences are sequentially fetched to shift registers of n stages at the same timing as the sampling timing in each of the A/D converters 5a to 5c and are shifted one stage by one every timing of a predetermined reference clock signal, thereby giving the delay of predetermined time $t=L_t/V$ where, V: reading linear velocity as mentioned above.

FIGS. 13 to 15 show examples of the sampling timings on the recording tracks in each of the states of FIGS. 5 to 7.

In FIGS. 13 to 15, an interval between the sampling timing points shown by "S" is equal to a channel bit length of the FIFO memory.

That is, the number n of stages of the FIFO memories satisfies the following relations.

$$\{(0.65\times\lambda/NA)^2-Tp^2\}^{1/2}/(V/fs)<n<\{(\lambda/NA)^2-Tp^2\}^{1/2}/(V/fs)$$

where,

λ: wavelength of reading beam

NA: numerical aperture of the objective lens 106

Tp: pitch between the recording tracks fs: sampling frequency

Although the read signals which were simultaneously read out from the three adjacent recording tracks are used in the tilt detecting circuit 20 in the embodiment, there is no need to simultaneously read the three tracks. For instance, two FIFO memories of two stages each having the memory capacity as much as one track are serially connected and the read signal read out by the pickup is input from the FIFO memory of the first stage. Now assuming that the read signal read by the pickup is the signal read out from the recording track (T−1) as shown in FIG. 5, the read signal read out from the recording track T is obtained from the output of the FIFO memory of the first stage and the read signal read out from the recording track (T+1) is obtained from the output of the FIFO memory of the second stage, respectively.

What is claimed is:

1. A tilt detecting method in a recorded information reproducing apparatus, in which a tilt occurring between a recording disk on which information has been recorded and a pickup for photoelectrically converting reflection light when a reading beam is irradiated onto a recording track formed on said recording disk and obtaining a read signal is detected, comprising the steps of:

setting a reading position of said pickup for a center recording track among three adjacent recording tracks to a reference;

detecting a crosstalk amount, as a first crosstalk from each of first positions on a recording track that is adjacent to said center recording track on the disk's inner rim side, said first positions being located forward and rearward along the direction of the recording track relative to said reading position by a predetermined distance in a reading direction;

detecting a crosstalk amount, as a second crosstalk, from each of second positions on a recording track that is adjacent to said center recording track on the disk's outer rim side, said second positions being located forward and rearward along the direction of the recording track relative to said reading position by a predetermined distance in the reading direction; and detecting the tilt occurring between said recording disk and said pickup on the basis of a balance between said first and second crosstalks, wherein said first positions are set at positions of a side lobe of said reading beam which is irradiated to the recording track that is adjacent to said center recording track on the disk's inner rim side when a tilt occurs between said recording disk and said pickup, and said second positions are set at positions of a side lobe of said reading beam which is irradiated to the recording track that is adjacent to said center recording track on the disk's outer rim side when a tilt occurs between said recording disk and said pickup.

2. A method according to claim 1, wherein said balance is discriminated by a difference between said first crosstalk and said second crosstalk.

3. A method according to claim 1, wherein said predetermined distance is defined as follows:

$$\{(0.65\times\lambda/NA)^2-Tp^2\}^{1/2}<(\text{said predetermined distance})<\{(\lambda/NA)^2-Tp^2\}^{1/2}$$

where, λ is a wavelength of said reading beam, NA is a numerical aperture of an objective lens of said pickup, and Tp is a pitch between the recording tracks.

4. A tilt detecting method in a recorded information reproducing apparatus, in which a tilt occurring between a recording disk on which information has been recorded and a pickup for photoelectrically converting reflection light when a reading beam is irradiated onto a recording track formed on said recording disk and obtaining a read signal is detected, comprising the steps of:

setting a reading position of said pickup for a center recording track among three adjacent recording tracks to a reference;

detecting a crosstalk amount, as a first crosstalk, from a first position on a recording track that is adjacent to said center recording track of the disk's inner rim side, said first position being located forward relative to said reading position by a predetermined distance in a reading direction;

detecting a crosstalk amount, as a second crosstalk, from a second position on a recording track that is adjacent to said center recording track on the disk's outer rim side, said second position being located forward relative to said reading position by a predetermined distance in the reading direction; and detecting the tilt occurring between said recording disk and said pickup on the basis of a balance between said first and second crosstalks, wherein said first position is set at a position of a side lobe of said reading beam which is irradiated to the recording track that is adjacent to said center recording track on the disk's inner rim side when a tilt occurs between said recording disk and said pickup, and said second position is set at a position of a side lobe of said reading beam which is irradiated to the recording track that is adjacent to said center recording track on the disk's outer rim side when a tilt occurs between said recording disk and said pickup.

5. A method according to claim 4, wherein said balance is discriminated by a difference between said first crosstalk and said second crosstalk.

6. A method according to claim 4, wherein said predetermined distance is defined as follows:

$$\{(0.65\times\lambda/NA)^2 - Tp^2\}^{1/2} < \text{(said predetermined distance)} < \{(\lambda/NA)^2 - Tp^2\}^{1/2}$$

where, $\lambda$ is a wavelength of said reading beam, NA is a numerical aperture of an objective lens of said pickup, and Tp is a pitch between the recording tracks.

7. A tilt detecting method in a recorded information reproducing apparatus, in which a tilt occurring between a recording disk on which information has been recorded and a pickup for photoelectrically converting reflection light when a reading beam is irradiated onto a recording track formed on said recording disk and obtaining a read signal is detected, comprising the steps of:

setting a reading position of said pickup for the center recording track among three adjacent recording tracks to a reference;

detecting a crosstalk amount, as a first crosstalk, from a first position on a recording track that is adjacent to said center recording track on the disk's inner rim side, said first position being located rearward relative to said reading position by a predetermined distance in a reading direction to said reading position;

detecting a crosstalk amount, as a second crosstalk, from a second position on a recording track that is adjacent to said center recording on the disk's outer rim side said second position being located rearward relative to said reading position. by a predetermined distance in the reading direction; and detecting the tilt occurring between said recording disk and said pickup on the basis of a balance between said first and second crosstalks, wherein said first position is set at a position of a side lobe of said reading beam which is irradiated to the recording track that is adjacent to said center recording track on the disk's inner rim side when a tilt occurs between said recording disk and said pickup, and said second position is set at a position of a side lobe of said reading beam which is irradiated to the recording track that is adjacent to said center recording track on the disk's outer rim side when a tilt occurs between said recording disk and said pickup.

8. A method according to claim 7, wherein said balance is discriminated by a difference between said first crosstalk and said second crosstalk.

9. A method according to claim 7, wherein said predetermined distance is defined as follows:

$$\{(0.65\times\lambda/NA)^2 - Tp^2\}^{1/2} < \text{(said predetermined distance)} < \{(\lambda/NA)^2 - Tp^2\}^{1/2}$$

where, $\lambda$ is a wavelength of said reading beam, NA is a numerical aperture of an objective lens of said pickup, and Tp is a pitch between the recording tracks.

* * * * *